(12) United States Patent
Lewis et al.

(10) Patent No.: US 10,500,632 B2
(45) Date of Patent: Dec. 10, 2019

(54) SELF-PIERCING RIVET INSTALLATION APPARATUS

(71) Applicant: Whitesell Formed Components, Inc., Waterford, MI (US)

(72) Inventors: Jeffrey C. Lewis, Addison Township, MI (US); Srecko Zdravkovic, Sterling Heights, MI (US)

(73) Assignee: PENN Automotive, Inc., Waterford, MI (US)

( * ) Notice: Subject to any disclaimer, the term of this patent is extended or adjusted under 35 U.S.C. 154(b) by 347 days.

(21) Appl. No.: 15/346,500

(22) Filed: Nov. 8, 2016

(65) Prior Publication Data

US 2018/0126448 A1 May 10, 2018

(51) Int. Cl.
   *B21J 15/32* (2006.01)
   *F16B 19/08* (2006.01)
   *B21J 15/02* (2006.01)

(52) U.S. Cl.
   CPC .............. *B21J 15/32* (2013.01); *B21J 15/025* (2013.01); *F16B 19/086* (2013.01)

(58) Field of Classification Search
   CPC ......... B21J 15/32; B21J 15/025; F16B 19/086
   See application file for complete search history.

(56) References Cited

U.S. PATENT DOCUMENTS

| | | | |
|---|---|---|---|
| 4,384,667 A | 5/1983 | Smallegan et al. |
| 4,459,073 A | 7/1984 | Miller |
| 4,543,701 A | 10/1985 | Miller |
| 4,615,475 A | 10/1986 | Fuhrmeister |
| 4,633,560 A | 1/1987 | Muller |
| 5,471,729 A | 12/1995 | Zoltaszek |
| 5,487,215 A | 1/1996 | Ladouceur |
| 5,752,305 A | 5/1998 | Cotterill et al. |
| 5,813,114 A | 9/1998 | Blacket et al. |
| 6,276,050 B1 | 8/2001 | Mauer et al. |
| 6,347,449 B1 | 2/2002 | Calkins et al. |
| 6,502,008 B2 | 12/2002 | Maurer et al. |
| 6,592,015 B1 | 7/2003 | Gostylla et al. |
| 6,789,309 B2 | 9/2004 | Kondo |
| 6,986,450 B2 | 1/2006 | Matthews et al. |

(Continued)

OTHER PUBLICATIONS

International Search Report and the Written Opinion of the International Searching Authority, dated Jan. 23, 2018, PCT/US17/60466.

*Primary Examiner* — John C Hong
(74) *Attorney, Agent, or Firm* — Gregory J. Gore, Esq.

(57) ABSTRACT

A self-piercing rivet installation apparatus includes a rigid C-frame and a drive spindle translatable along a rivet installation axis through a first jaw of the rigid C-frame. An installation head has an installation head mounting end mountable to a leading end of the drive spindle. A mounting post having a mounting post root end is matingly engaged with a jaw socket defined coaxially with the rivet installation axis in a second jaw of the rigid C-frame. A coupling tube has a coupling tube mounting end. A riveting anvil is removably mounted to the coupling tube to form an anvil mounting assembly. The anvil mounting assembly is alternatively mountable on the drive spindle and the mounting post. The installation head is alternatively mountable on the mounting post and the drive spindle opposite the anvil mounting assembly.

17 Claims, 5 Drawing Sheets

(56) References Cited

U.S. PATENT DOCUMENTS

| | | |
|---|---|---|
| 7,032,296 B2 | 4/2006 | Zdravkovic et al. |
| 7,077,608 B2 | 7/2006 | Hartman |
| 7,331,098 B2 | 2/2008 | Matthews et al. |
| 7,475,468 B2 | 1/2009 | Mauer et al. |
| 7,748,097 B1 | 7/2010 | Matthews et al. |
| 7,752,739 B2 * | 7/2010 | Mauer ............... B21J 15/025 29/243.53 |
| 7,810,231 B2 * | 10/2010 | Naitoh ............... B21J 15/025 29/524.1 |
| 8,434,215 B2 | 5/2013 | Naito et al. |
| 8,992,143 B2 | 3/2015 | Glimpel et al. |
| 9,015,920 B2 | 4/2015 | Mauer et al. |
| 9,027,220 B2 | 5/2015 | Schlafhauser |
| 2004/0111878 A1 | 6/2004 | Naito |
| 2009/0266866 A1 | 10/2009 | Davies et al. |
| 2011/0016939 A1 | 1/2011 | Clew et al. |
| 2011/0173803 A1 | 7/2011 | Naito et al. |
| 2013/0263433 A1 | 10/2013 | Stoian |
| 2014/0041193 A1 | 2/2014 | Schlafhauser |

\* cited by examiner

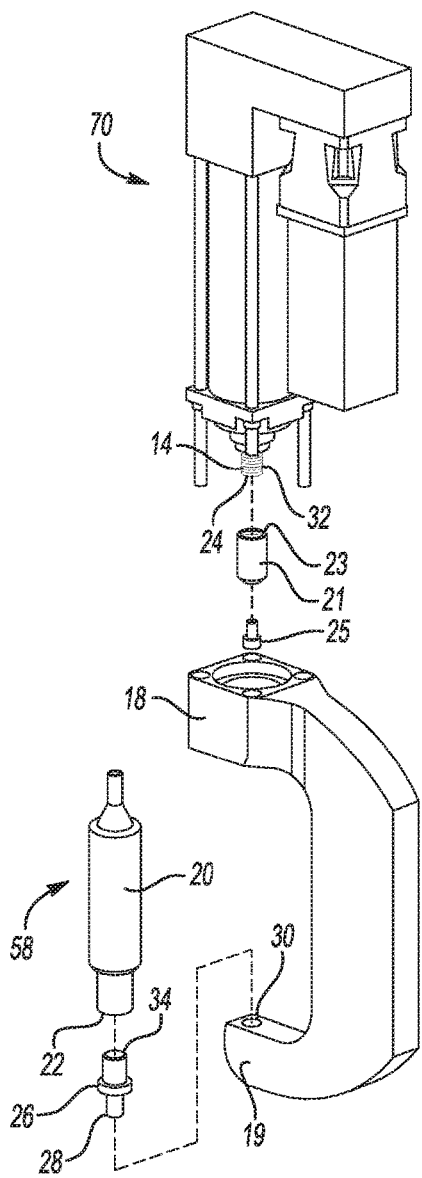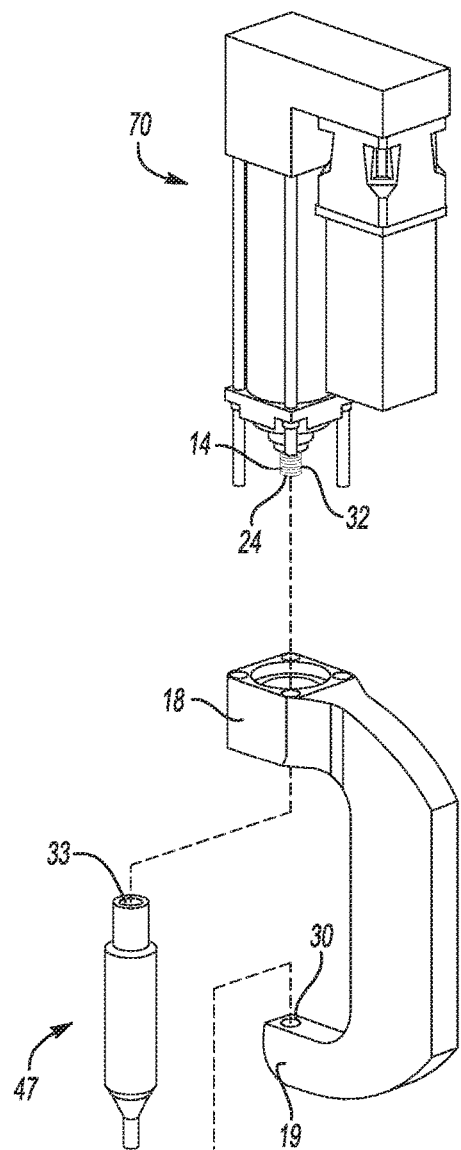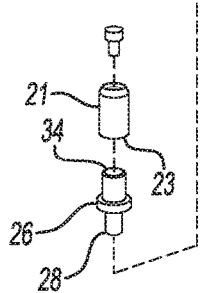

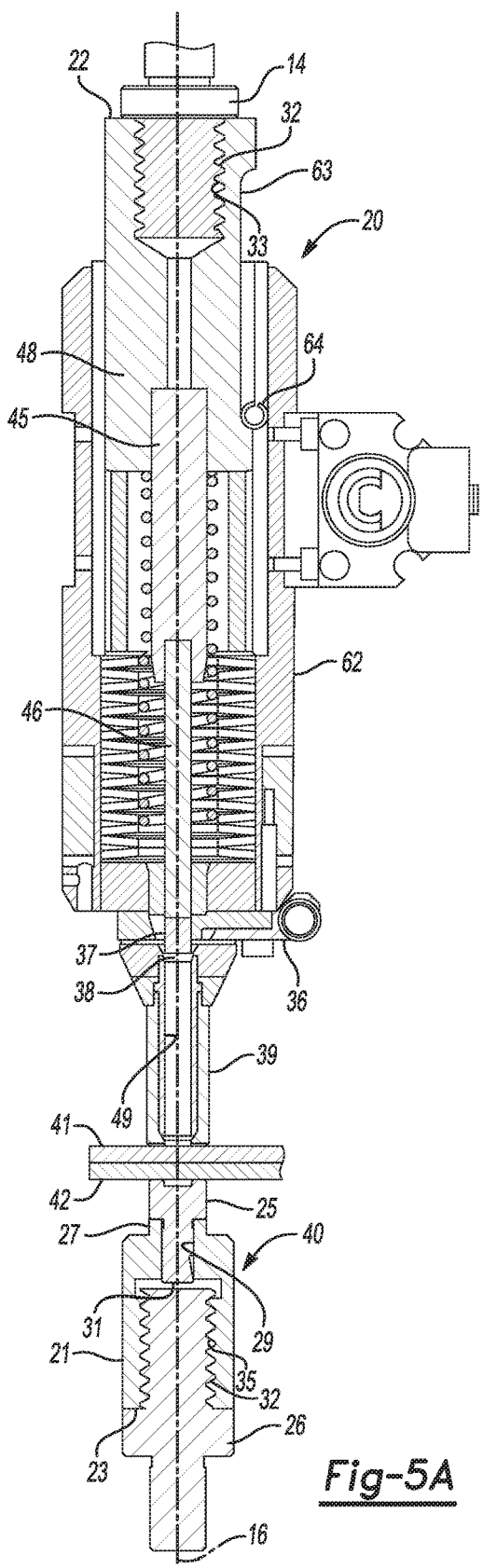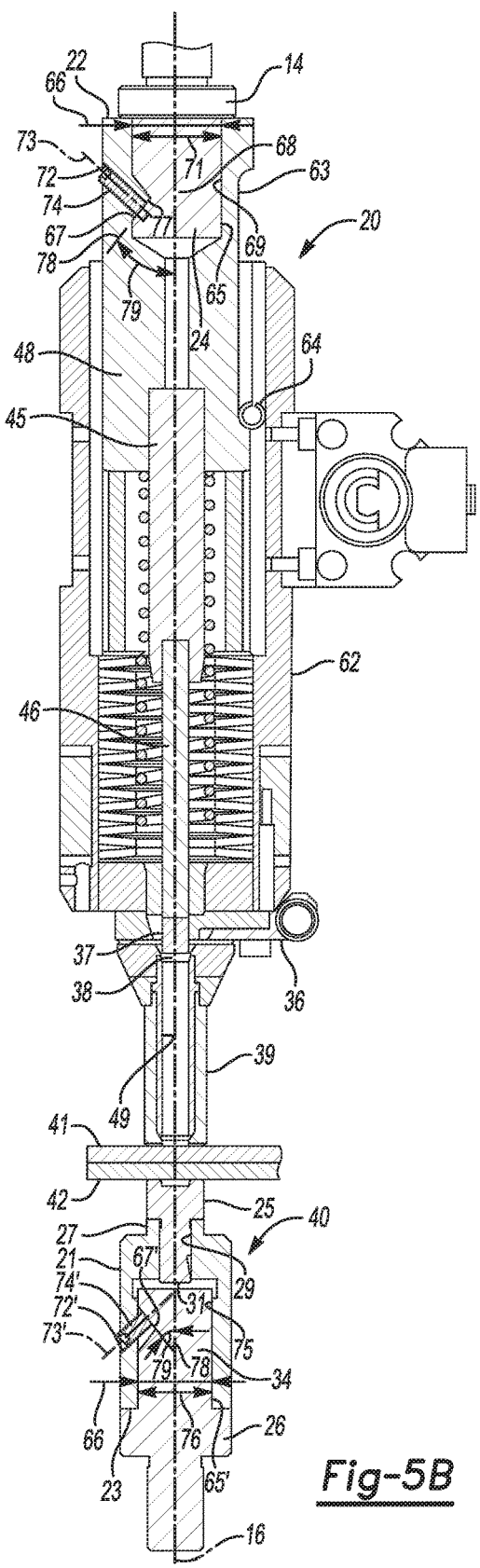
*Fig-5A*  *Fig-5B*

SELF-PIERCING RIVET INSTALLATION APPARATUS

BACKGROUND

Some self-piercing rivets are used to join panels together without welding. The term "self-piercing" as used herein refers to a permanently installable rivet that has a piercing portion to pierce an opening in the panels to be joined. Some self-piercing rivets are used in mass production of products. Many instances of a self-piercing rivet may be installed in rapid succession from an automated installation head. For example, sheet metal panels may be joined with self-piercing rivets to form body parts of an automobile without welding.

SUMMARY

A self-piercing rivet installation apparatus includes a rigid C-frame and a drive spindle translatable along a rivet installation axis through a first jaw of the rigid C-frame. An installation head has an installation head mounting end mountable to a leading end of the drive spindle. A mounting post having a mounting post root end is matingly engaged with a socket defined coaxially with the rivet installation axis in a second jaw of the rigid C-frame. A coupling tube has a coupling tube mounting end. A riveting anvil is removably mounted to the coupling tube to form an anvil mounting assembly. The anvil mounting assembly is alternatively mountable on the drive spindle and the mounting post. The installation head is alternatively mountable on the mounting post and the drive spindle opposite the anvil mounting assembly.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 is a semi-schematic partially exploded rear perspective view of the example of the self-piercing rivet installation apparatus depicted in FIG. 2 in the distal operational mode according to the present disclosure;

FIG. 4 is a semi-schematic partially exploded rear perspective view of the example of the self-piercing rivet installation apparatus depicted in FIG. 1A in the proximal operational mode according to the present disclosure;

FIG. 5A is a semi-schematic partial cross-sectional view of a portion of the example of the self-piercing rivet installation apparatus with the cross-section taken as indicated in FIG. 1A according to the present disclosure;

FIG. 5B is a semi-schematic partial cross-sectional view of a portion of the example of the self-piercing rivet installation apparatus with the cross-section taken as indicated in FIG. 1A according to the present disclosure;

DETAILED DESCRIPTION

Figure 1A:
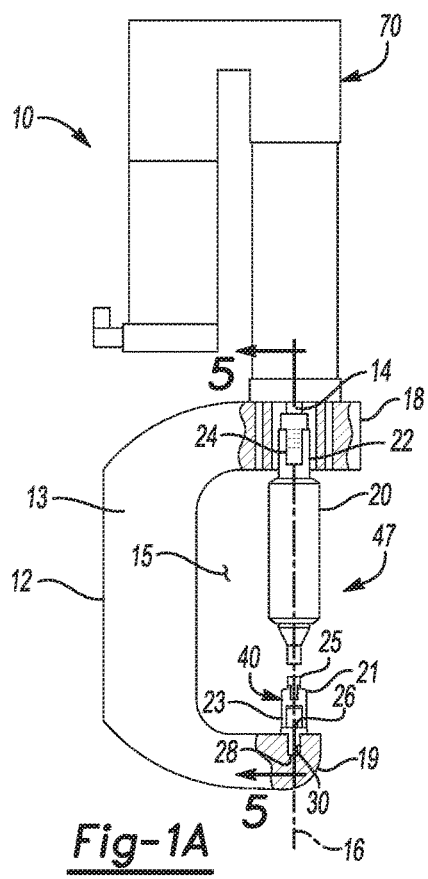
FIG. 1A is a semi-schematic left side view of an example of a self-piercing rivet installation apparatus depicted in a proximal operational mode according to the present disclosure.

Self-piercing fasteners for example, self-piercing rivets, are used in mass production applications such as in the production of automobiles. In some existing self-piercing rivet installation systems, an installation head is inseparable from the drive spindle. Examples of the self-piercing rivet installation apparatus according to the present disclosure are improvements over existing self-piercing rivet installation systems. The installation head 20 of the present disclosure is separable from the drive spindle thereby facilitating service, adjustment and replacement of the installation head 20. In examples of the present disclosure, the installation head 20 is advantageously separable from the drive spindle 14. The installation head 20 and the anvil mounting assembly 40 have interchangeable mounting structures, thereby allowing the installation head 20 and the anvil mounting assembly 40 to have their locations on the self-piercing rivet installation apparatus 10 reversed one for the other. Thus the riveting modes of the self-piercing rivet installation apparatus 10 accommodates riveting in two opposite directions relative to the orientation of the rigid C-frame 12. Further, the installation head 20 is symmetrical about the rivet installation axis 16, thus allowing easy setup for either right hand feeding of the self-piercing rivets 37 or left hand feeding of the self-piercing rivets.

Further, having the installation head 20 and the anvil mounting assembly 40 with their locations on the self-piercing rivet installation apparatus 10 reversible one for the other, advantageously allows the self-piercing rivet installation apparatus 10 to install self-piercing rivets in a variety of locations that would not have been accessible to a single-mode riveting device. Examples of the self-piercing rivet installation apparatus 10 of the present disclosure may install rivets with the rivet head facing the inside or outside of a vehicle without having to maneuver the actuator assembly 70 inside the vehicle (for example through a window opening). Such heretofore unknown flexibility may lead to reduced tooling costs of an assembly line, reduced time to install rivets, and design flexibility with reduced "no go" zones that come from being unable to fit the actuator assembly 70 in certain places.

Figure 2:
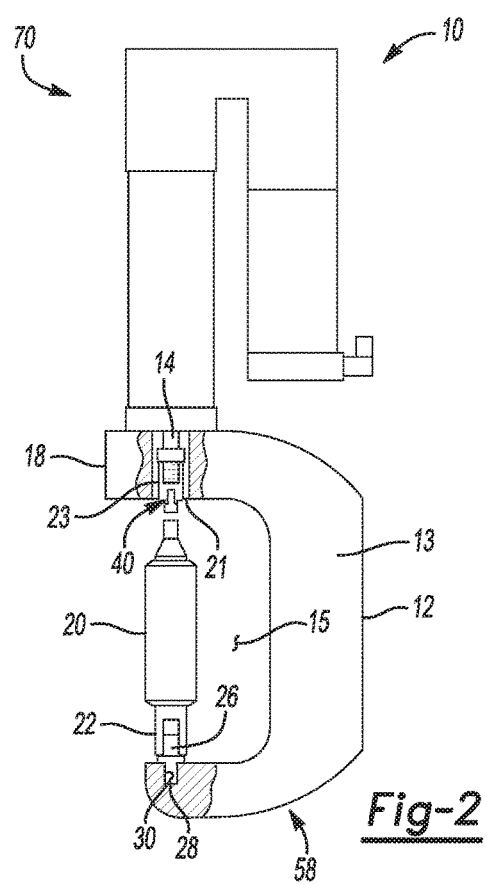
FIG. 2 is a semi-schematic right side view of the example of the self-piercing rivet installation apparatus depicted in FIG. 1A in a distal operational mode according to the present disclosure.

FIG. 1A is a semi-schematic left side view of an example of a self-piercing rivet installation apparatus 10 depicted in a proximal operational mode 47 according to the present disclosure. FIG. 2 is a semi-schematic right side view of the example of the self-piercing rivet installation apparatus 10 depicted in FIG. 1A in a distal operational mode 58 according to the present disclosure.

As depicted in FIG. 1A and FIG. 2, the self-piercing rivet installation apparatus 10 includes a rigid C-frame 12. A drive spindle 14 is translatable along a rivet installation axis 16 through a first jaw 18 of the rigid C-frame 12. An installation head 20 has an installation head mounting end 22. The installation head 20 is mountable to a leading end 24 of the drive spindle 14 by connecting the installation head mounting end 22 of the installation head 20 to the leading end 24 of the drive spindle 14. A mounting post 26 has a mounting post root end 28 matingly engaged with a jaw socket 30 defined coaxially with the rivet installation axis 16 in a second jaw 19 of the rigid C-frame 12. The mounting post 26 is rigidly attached to the second jaw 19 of the rigid C-frame 12. A coupling tube 21 has a coupling tube mounting end 23. A riveting anvil 25 is removably mounted to the coupling tube 21 to form an anvil mounting assembly 40. The anvil mounting assembly 40 is alternatively mountable on the drive spindle 14 and the mounting post 26. The installation head 20 is alternatively mountable on the mounting post 26 and the drive spindle 14 opposite the anvil mounting assembly 40. Mounting of the anvil mounting assembly 40 and the installation head 20 may be by, for example, a threaded mount, friction shaft mount, keyed shaft mount, splined shaft mount or any suitable mounting system for rigidly, yet removably, joining a shaft to another part.

The rigid C-frame 12 has a rigid back 13. The first jaw 18 extends from the rigid back 13. The second jaw 19 extends from the rigid back 13 to form a mouth 15 of the rigid C-frame 12. The depth of mouth 15 may be larger or smaller; a larger depth of the mouth may be combined with a stiffer rigid back 13 to provide rigidity, durability and repeatability in the installation of the self-piercing rivets 37 installed using the self-piercing rivet installation apparatus 10.

Figure 1B:
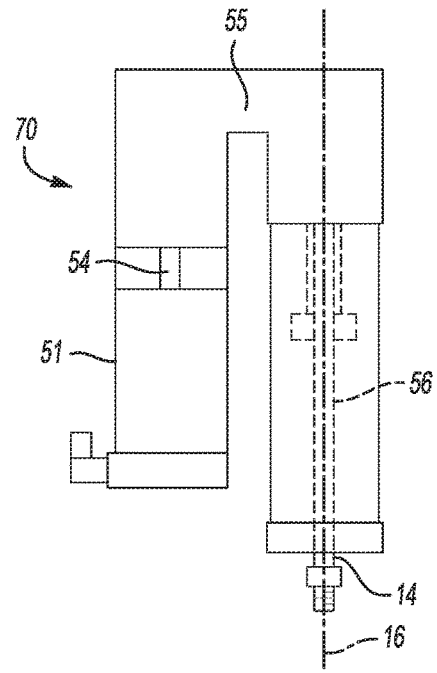
FIG. 1B is a schematic left side detail view of an example of an actuator assembly according to the present disclosure.
Figure 1C:
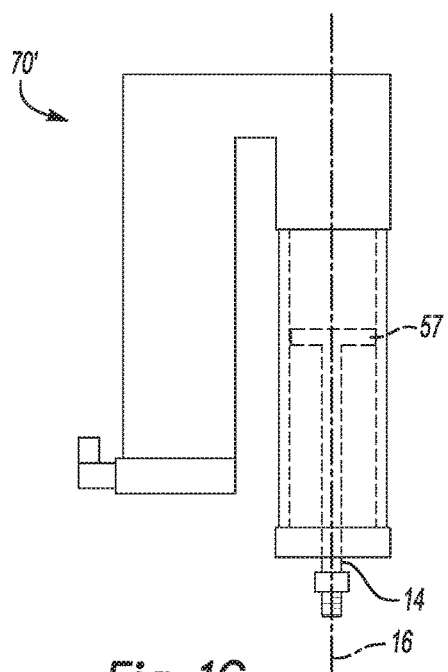
FIG. 1C is a schematic left side detail view of another example of an actuator assembly according to the present disclosure.

The self-piercing rivet installation apparatus 10 may include an actuator assembly 70 mounted on the rigid C-frame 12. The actuator assembly 70 is to actuate the drive spindle 14 along the rivet installation axis 16. In the example of the present disclosure depicted in FIG. 1B, the actuator assembly 70 may further include an actuator 51 having an output shaft 54 to rotate with an output torque. The actuator assembly 70 may include a transmission 55 to multiply the output torque from the output shaft 54 and to turn a jack screw 56 to actuate the drive spindle 14 along the rivet installation axis 16. In the example depicted in FIG. 1C, the actuator assembly 70' may include a hydraulic piston 57 connected to the drive spindle 14 to actuate the drive spindle 14.

As used herein, "actuator" means a type of motor that is responsible for moving or controlling a mechanism or system. An actuator is operated by a source of energy, typically electric current, hydraulic fluid pressure, or pneumatic pressure, and converts that energy into motion. In examples of the present disclosure, the actuator 51 may be a rotary actuator. In other examples, the actuator 51 may be a linear actuator. In examples of the present disclosure, the actuator 51 may be an electric motor. The actuator 51 may be an air motor. The actuator 51 may include a ball screw mechanism, ratchet mechanism, cam mechanism, gear drive, roller mechanism, solenoid, piston, geartrain, cogwheel, pulley/drive belt, or any actuating device for actuating the drive spindle 14 along the rivet installation axis 16. Actuating the drive spindle 14 includes advancing and retracting the drive spindle 14 along the rivet installation axis 16. Actuating the drive spindle 14 may also include rotating the drive spindle 14 along the rivet installation axis 16.

In examples of the present disclosure, the interchangeable mounting of the installation head 20 and the anvil mounting assembly 40 is accomplished using the same mounting thread on the installation head 20 and the anvil mounting assembly 40. A first instance of an external mounting thread 32 is defined on the leading end 24 of the drive spindle 14. For example, the external mounting thread 32 may be an M27×3.0P thread according to the International Organization for Standards (ISO) metric screw thread. Other thread specifications are contemplated herein. An internal mounting thread 33, complementary to the external mounting thread 32, is defined in the installation head mounting end 22 of the installation head 20. The mounting post 26 has a stud end 34 distal to the mounting post root end 28. The stud end 34 has a second instance of the external mounting thread 32 defined thereon. As used herein, "first instance" and "second instance" are used to distinguish a feature that is common between two distinct parts. The terms "first instance" and "second instance" do not convey order or preference between the distinct instances of the external mounting thread 32. Therefore, the internal mounting thread 33 of the installation head 20 may be alternatively threadingly engaged with the first instance of the external mounting thread 32 and the second instance of the external mounting thread 32. The interchangability of the second instance of the external mounting thread 32 on the mounting post 26 and the first instance of the external mounting thread 32 on the drive spindle 14 allows the self-piercing rivet installation apparatus to be alternatively configured in the proximal operational mode 47 and the distal operational mode 58 without requiring adapters or additional hardware.

In examples of the present disclosure, the coupling tube mounting end 23 of the coupling tube 21 may have an inside mounting thread 35 defined therein. The inside mounting thread 35 is complementary to the external mounting thread 32. Therefore, the coupling tube 21 fits on the mounting post 26 and the drive spindle 14 because the mounting post 26 and the drive spindle 14 each have an instance of the external mounting thread 32 defined thereon. The coupling tube 21 has a coupling tube anvil end 27 opposite to the coupling tube mounting end 23. The coupling tube anvil end 27 has an anvil receiving socket 29 defined therein. The riveting anvil 25 has an anvil root end 31 penetrating into and removably engaging the coupling tube 21 to rigidly mount the riveting anvil 25 and form the anvil mounting assembly 40.

In examples of the present disclosure, the anvil mounting assembly 40 is alternatively threadingly mountable on the drive spindle 14 and the mounting post 26; and the installation head 20 is alternatively threadingly mountable on the mounting post 26 and the drive spindle 14 opposite the anvil mounting assembly 40. It is to be understood that an apparatus that is only capable of mounting the anvil mounting assembly 40 on only one of the mounting post 26 or the drive spindle 14 does not meet the elements of the present disclosure.

The installation head 20 includes a feed mechanism 36 to automatically feed separate, self-piercing rivets 37 into a breech end 38 of a tubular nose piece 39. The self-piercing rivets 37 may be transferred to the feed mechanism 36 from a hopper filled with individual rivets, a reel with rivets attached to a tape or wire, a magazine, or any device capable of holding and delivering a plurality of the self-piercing rivets. The self-piercing rivets 37 may be set one-at-a-time with each reciprocating stroke of the installation head 20. In examples of the present disclosure configured as depicted in FIG. 1A and FIG. 4, the installation head 20 may stroke actively from movement of the installation head 20 relative to the rigid C-frame 12 when the self-piercing rivet installation apparatus 10 is in the proximal operational mode 47 and motion of the drive spindle 14 moves the installation head mounting end 22 away from the first jaw 18 and the anvil mounting assembly 40 is mounted on the mounting post 26 in the second jaw 19. As depicted in FIG. 2 and FIG. 3, examples of the present disclosure may be configured so the installation head 20 may also stroke reactively from movement of the anvil mounting assembly 40 driven by the drive spindle 14 when the self-piercing rivet installation apparatus 10 is in the distal operational mode 58. In both the proximal operational mode 47 and the distal operational mode 58, the self-piercing rivet installation apparatus 10 is to clamp a first workpiece layer 41 against a second workpiece layer 42 between the tubular nose piece 39 and the riveting anvil 25.

FIG. 5A is a semi-schematic partial cross-sectional view of a portion of the example of the self-piercing rivet installation apparatus 10 with the cross-section taken as indicated in FIG. 1A according to the present disclosure. In the examples depicted in FIG. 5A and FIG. 5B, the installation head 20 includes a ram 48 disposed at the installation head mounting end 22 of the installation head 20. In the example depicted in FIG. 5A, the ram 48 has the internal mounting thread 33 defined therein. The ram 48 is movable relative to an installation head housing 62 along the rivet installation axis 16. A flat groove 63 is defined on ram 48. The flat groove 63 cooperates with a roll pin 64 to limit the relative motion of the ram 48 within the installation head housing 62. The relative reciprocating motion of the ram 48 and any connected parts within the installation head housing 62 is the stroke of the installation head 20. A setting punch 45 is rigidly attached to the ram 48. The setting punch 45 is coaxial to the rivet installation axis 16. A setting pin 46 is rigidly attached to the setting punch 45. The setting pin 46 is coaxial to the rivet installation axis 16. The setting pin 46 is axially translatable relative to a bore 49 defined coaxially with the rivet installation axis 16 in the tubular nose piece 39.

As disclosed herein above, the self-piercing rivet installation apparatus 10 has both a proximal operational mode 47, for example, depicted in FIG. 1A, and a distal operational mode 58, for example, depicted in FIG. 2. When configured for the proximal operational mode 47, the anvil mounting assembly 40 is mounted on the mounting post 26 in the second jaw 19. In the proximal operational mode 47, the installation head 20 is mounted on the drive spindle 14. In the proximal operational mode 47, the drive spindle 14 is to drive the installation head 20 and the ram 48 along the rivet installation axis 16 toward the riveting anvil 25. After the first workpiece layer 41 and the second workpiece layer 42 are clamped between the tubular nose piece 39 and the riveting anvil 25, the drive spindle 14 continues to drive the ram 48 toward the riveting anvil 25, causing the ram 48, the setting punch 45, and the setting pin 46 to stroke in the installation head housing 62 and to set the self-piercing rivet 37.

When configured for the distal operational mode 58, the anvil mounting assembly 40 is mounted on the drive spindle 14, and the installation head 20 is mounted on the mounting post 26 in the second jaw 19 as depicted in FIG. 2 and FIG. 3. In the distal operational mode 58, the drive spindle 14 is to drive the riveting anvil 25 along the rivet installation axis 16 toward the installation head 20. After the first workpiece layer 41 and the second workpiece layer 42 (see FIG. 5A and FIG. 5B) are clamped between the riveting anvil 25 and the tubular nose piece 39, the drive spindle 14 continues to drive the riveting anvil 25 toward the ram 48, causing the tubular nose piece 39 and the installation head housing 62 with the first workpiece layer 41 and the second workpiece layer 42 clamped therebetween to move relative to the rigid C-frame 12. Since the ram 48 is attached to mounting post 26, which in turn is attached to the second jaw 19 of the rigid C-frame 12, the installation head 20 strokes by moving the tubular nose piece 39 and the installation head housing 62 relative to the ram 48 and other parts attached to the rigid C-frame 12. Thus the ram 48, the setting punch 45, and the setting pin 46 stroke in the installation head housing 62 to set the self-piercing rivet 37.

FIG. 5B is a semi-schematic partial cross-sectional view of a portion of the example of the self-piercing rivet installation apparatus 10 with the cross-section taken as indicated in FIG. 1A according to the present disclosure. The difference between the example depicted in FIG. 5B and the example depicted in FIG. 5A is the threaded mounting system in FIG. 5A and the whistle notch mounting system depicted in FIG. 5B. As depicted in FIG. 5B, a first instance of an external mounting surface 65 having an external mounting surface diameter 66 is defined on a shank 68 of the drive spindle 14. A first whistle notch 67 is defined in the first instance of the external mounting surface 65 defined on the shank 68 of the drive spindle 14.

A whistle notch, as used herein means an axially-extending flat 77 defined in a shaft or shank, which is engageable by a set-screw 74, 74' to positively retain the shaft or shank against rotation in a device having an aperture. In examples of the present disclosure, the axially extending flat 77 is formed in a plane 78 inclined at an angle 79 to the rivet installation axis 16. The angle may be about 50 degrees as depicted in FIG. 5B. The angle of the axially extending flat 77 assures that when the set-screw 74, 74' is tightened against the axially extending flat 77, the shaft or shank cannot axially decouple from the device having the aperture during use.

An internal mounting socket 69 having an internal mounting socket diameter 71, complementary to the external mounting surface diameter 66, is defined in the installation head mounting end 22 of the installation head 20. A first threaded set-screw bore 72 having a first set-screw axis 73 is defined in the installation head mounting end 22 of the installation head 20 to receive a first set-screw 74. The first set-screw axis 73 is oblique to the rivet installation axis 16 and normal to the axially extending flat 77.

When the installation head 20 is mounted on the drive spindle 14, (i.e. in the proximal operational mode 47) the first set-screw 74 is to removably contact the first whistle notch 67, thereby preventing the installation head 20 from rotating relative to the shank 68 of the drive spindle 14 and thereby urging the shank 68 of the drive spindle 14 deeper into the internal mounting socket 69 to lock the installation head 20 onto the drive spindle 14.

In the example depicted in FIG. 5B, the mounting post 26 has a stud end 34 distal to the mounting post root end 28. The stud end 34 has a second instance of the external mounting surface 65' having the external mounting surface diameter 66. A second whistle notch 67' is defined in the second instance of the external mounting surface 65' defined on the mounting post 26. The stud end 34 of the mounting post 26 and the leading end 24 of the drive spindle 14 are dimensionally the same, with the first whistle notch 67 and the second whistle notch 67' also being dimensionally the same and being located similarly along the respective external mounting surface 65, 65'. Therefore, installation head 20 may be mounted on the drive spindle 14 (in the proximal operational mode 47) or the mounting post 26 (in the distal operational mode 58).

In the example depicted in FIG. 5B, the coupling tube mounting end 23 of the coupling tube 21 has an inside mounting surface 75 defined therein. The inside mounting surface 75 has an inside mounting surface diameter 76 complementary to the external mounting surface diameter 66. A second threaded set-screw bore 72' having a second set-screw axis 73' is defined in the coupling tube 21 to receive a second set-screw 74'. The second set-screw axis 73' is oblique to the rivet installation axis 16.

In the example depicted in FIG. 5B, when the anvil mounting assembly 40 is mounted on the mounting post 26 (i.e. in the proximal operational mode 47), the second set-screw 74' is to removably contact the second whistle notch 67', thereby preventing the anvil mounting assembly 40 from rotating relative to the mounting post 26 and thereby urging the mounting post 26 deeper into the coupling tube 21 to lock the coupling tube 21 onto the mounting post 26.

The coupling tube 21 has a coupling tube anvil end 27 opposite to the coupling tube mounting end 23. The coupling tube anvil end 27 has an anvil receiving socket 29 defined therein. The riveting anvil 25 has an anvil root end 31 penetrating into and removably engaging the coupling tube 21 to rigidly mount the riveting anvil 25 and form the anvil mounting assembly 40. Therefore, anvil mounting assembly 40 may be mounted on the mounting post (in the proximal operational mode 47) or the drive spindle 14 (in the distal operational mode 58).

Figure 6:
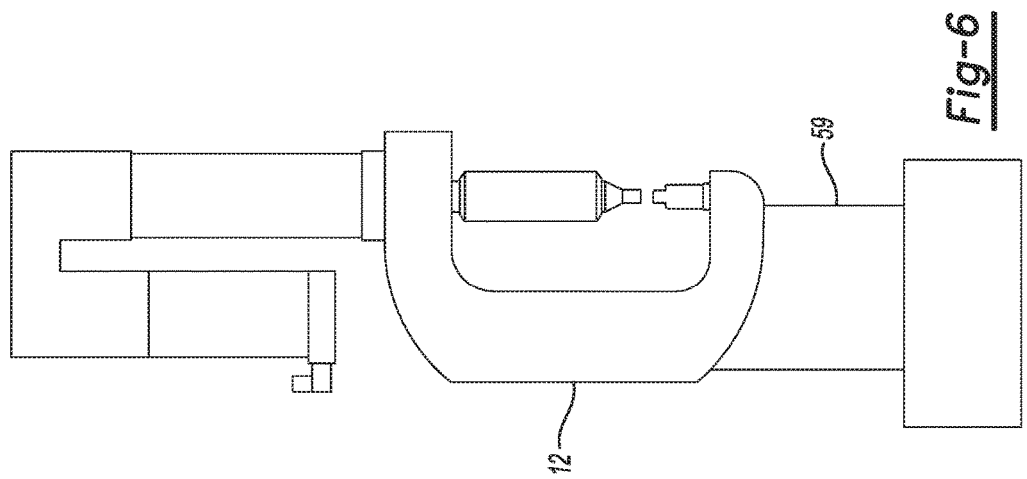
FIG. 6 is a semi-schematic left side view of the example of the self-piercing rivet installation apparatus depicted in FIG. 1A with the rigid C-frame mounted on a pedestal according to the present disclosure.

FIG. 6 is a side view of an example of the self-piercing rivet installation apparatus with a stationary pedestal mount. With the rigid C-frame 12 mounted on the pedestal 59, the workpiece layers may be maneuvered relative to the self-piercing rivet installation apparatus.

Figure 7:
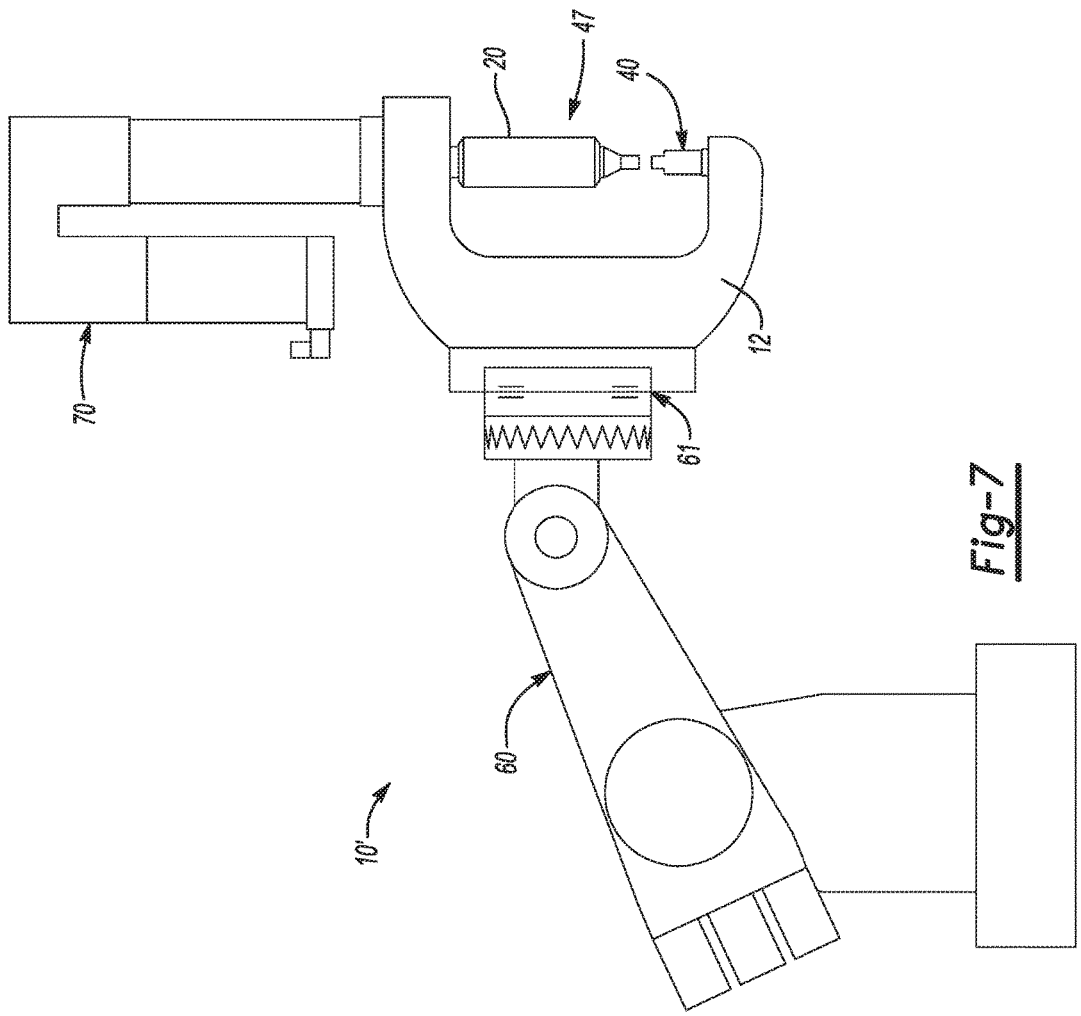
FIG. 7 is a semi-schematic left side view of the example of the self-piercing rivet installation apparatus depicted in FIG. 1A with the rigid C-frame mounted on a robotic arm according to the present disclosure.

In examples of the present disclosure, the self-piercing rivet installation apparatus 10 may include a robotic arm 60 to manipulate the rigid C-frame 12. As depicted in FIG. 7, the rigid C-frame 12 may be mounted on the robotic arm 60 to form a robotic self-piercing rivet installation apparatus 10'. The term "robotic", as used in the "robotic self-piercing rivet installation apparatus 10'" herein, does not mean a stationary mounting of the self-piercing rivet installation apparatus 10 that is operated automatically; for example, a stationary mounted example of the self-piercing rivet installation apparatus 10 that has the panel presented by a material handling robot or a stationary mounted example of the self-piercing rivet installation apparatus 10 that is tended by a robot. Although examples of such stationary mounted self-piercing rivet installation apparatus 10 are contemplated and disclosed herein, a robotic self-piercing rivet installation apparatus 10' includes a robotic arm 60 to manipulate the rigid C-frame 12. Manipulating the rigid C-frame 12 means moving the whole rigid C-frame 12 as a rigid body.

The example of the robotic self-piercing rivet installation apparatus 10' depicted in FIG. 7 includes the actuator assembly 70, the anvil mounting assembly 40, the installation head 20 and all of the other elements of the self-piercing rivet installation apparatus 10 disclosed herein. Although the example of the robotic self-piercing rivet installation apparatus 10' depicted in FIG. 7 is shown configured for the proximal operational mode 47, it is to be understood that the robotic self-piercing rivet installation apparatus 10' may be configured to operate in both the proximal operational mode 47 and the distal operational mode 58 depicted in FIG. 2 and FIG. 3. When the self-piercing rivet installation apparatus 10 is a robotic self-piercing rivet installation apparatus 10', the robotic self-piercing rivet installation apparatus 10' may be maneuvered with respect to the first workpiece layer 41, the second workpiece layer 42, or any additional workpiece layers. In the example depicted in FIG. 7, the robotic self-piercing rivet installation apparatus 10' includes a linear slide bearing 61 (schematically depicted in FIG. 7) disposed between the rigid C-frame 12 and the robotic arm 60. The linear slide bearing 61 allows the rigid C-frame 12 to move relative to the robotic arm 60 parallel to the rivet installation axis 16. In the distal operational mode 58, the riveting anvil 25 moves with respect to the rigid C-frame 12. In the distal operational mode 58, the installation head 20 strokes in reaction to the actuation of the riveting anvil 25 which is attached to the drive spindle 14. The linear slide bearing 61 allows the rigid C-frame 12 to move relative to the workpiece layers 41, 42 clamped between the riveting anvil 25 and the tubular nose piece 39 of the installation head 20, even though the robotic arm 60 is temporarily in a fixed location for accurate installation of the self-piercing rivet 37 in the workpiece layers 41, 42. The linear slide bearing 61 may prevent the robotic self-piercing rivet installation apparatus 10' from distorting the workpiece layers 41, 42 when the installation head 20 strokes in the distal operational mode 58.

Figure 8:
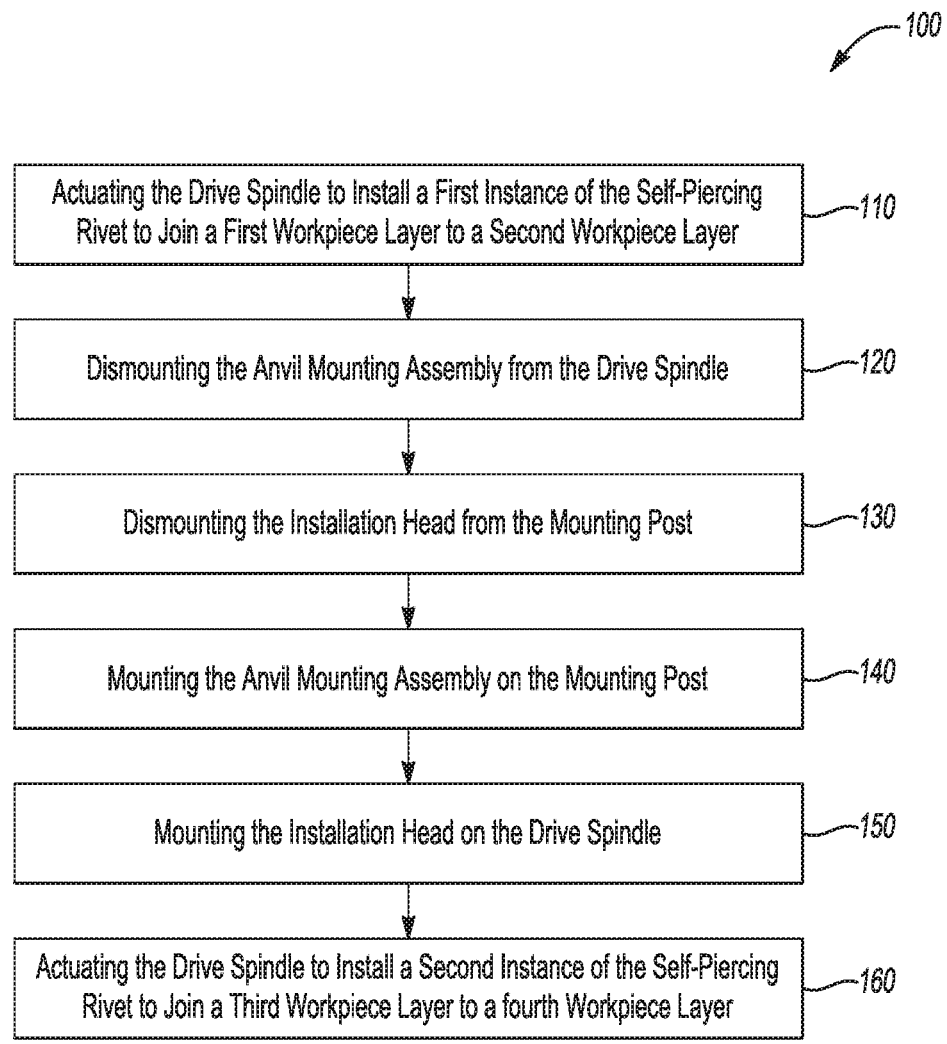
FIG. 8 is a flow chart depicting an example of a method of operating the self-piercing rivet installation apparatus according to the present disclosure.

FIG. 8 is a flow chart depicting an example of a method 100 of operating the self-piercing rivet installation apparatus 10, 10' according to the present disclosure. At 110, the method includes "actuating the drive spindle to install a first instance of the self-piercing rivet to join a first workpiece layer to a second workpiece layer". At 120, the method includes "dismounting the anvil mounting assembly from the drive spindle". "Dismounting the installation head from the mounting post" is at 130. "Mounting the anvil mounting assembly on the mounting post" is at 140. "Mounting the installation head on the drive spindle" is at 150. At 160, the method includes "actuating the drive spindle to install a second instance of the self-piercing rivet to join a third workpiece layer to a fourth workpiece layer." The third workpiece layer may be similar to the first workpiece layer 41, and the fourth workpiece layer may be similar to the second workpiece layer 42. The steps of the method 100 may be performed in any suitable order. For example, the anvil mounting assembly may be dismounted from the drive spindle after dismounting the installation head from the mounting post. The method includes operating the self-piercing rivet installation apparatus 10, 10' in both the proximal operational mode 47 and the distal operational mode 58.

It is to be understood that disclosure of any ranges herein is for convenience and brevity and should be interpreted flexibly to include not only the numerical values explicitly recited as the limits of the range, but also to include all the individual numerical values or sub-ranges encompassed within that range as if each numerical value and sub-range is explicitly recited. Furthermore, when "about" or "approximately" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A self-piercing rivet installation apparatus, comprising:
a rigid C-frame;
a drive spindle translatable along a rivet installation axis through a first jaw of the rigid C-frame;
an installation head having an installation head mounting end mountable to a leading end of the drive spindle;
a mounting post having a mounting post root end matingly engaged with a jaw socket defined coaxially with the rivet installation axis in a second jaw of the rigid C-frame;
a coupling tube having a coupling tube mounting end; and
a riveting anvil removably mounted to the coupling tube to form an anvil mounting assembly, wherein:
the anvil mounting assembly is alternatively mountable on the drive spindle and the mounting post; and
the installation head is alternatively mountable on the mounting post and the drive spindle opposite the anvil mounting assembly.

2. The self-piercing rivet installation apparatus as defined in claim 1 wherein:
the rigid C-frame has a rigid back;
the first jaw extends from the rigid back;
the second jaw extends from the rigid back to form a mouth of the rigid C-frame;
a first instance of an external mounting thread is defined on the leading end of the drive spindle;
an internal mounting thread, complementary to the external mounting thread, is defined in the installation head mounting end of the installation head;
the mounting post has a stud end distal to the mounting post root end; and
the stud end has a second instance of the external mounting thread defined thereon.

3. The self-piercing rivet installation apparatus as defined in claim 2 wherein:
the coupling tube mounting end of the coupling tube has an inside mounting thread defined therein;
the inside mounting thread is complementary to the external mounting thread;
the coupling tube has a coupling tube anvil end opposite to the coupling tube mounting end, the coupling tube anvil end having an anvil receiving socket defined therein;
the riveting anvil has an anvil root end penetrating into and removably engaging the coupling tube to rigidly mount the riveting anvil and form the anvil mounting assembly;
the anvil mounting assembly is alternatively threadingly mountable on the drive spindle and the mounting post; and
the installation head is alternatively threadingly mountable on the mounting post and the drive spindle opposite the anvil mounting assembly.

4. The self-piercing rivet installation apparatus as defined in claim 1 wherein:
the rigid C-frame has a rigid back;
the first jaw extends from the rigid back;
the second jaw extends from the rigid back to form a mouth of the rigid C-frame;
a first instance of an external mounting surface having an external mounting surface diameter is defined on a shank of the drive spindle;
a first whistle notch is defined in the first instance of the external mounting surface defined on the shank of the drive spindle;
an internal mounting socket having an internal mounting socket diameter, complementary to the external mounting surface diameter, is defined in the installation head mounting end of the installation head;
a first threaded set-screw bore having a first set-screw axis is defined in the installation head mounting end of the installation head to receive a first set-screw;
the first set-screw axis is oblique to the rivet installation axis;
when the installation head is mounted on the drive spindle, the first set-screw is to removably contact the first whistle notch, thereby preventing the installation head from rotating relative to the shank of the drive spindle and thereby urging the shank of the drive spindle deeper into the internal mounting socket to lock the installation head onto the drive spindle;
the mounting post has a stud end distal to the mounting post root end;
the stud end has a second instance of the external mounting surface having the external mounting surface diameter; and
a second instance of the whistle notch is defined in the second instance of the external mounting surface defined on the mounting post.

5. The self-piercing rivet installation apparatus as defined in claim 4 wherein:
the coupling tube mounting end of the coupling tube has an inside mounting surface defined therein;
the inside mounting surface has an inside mounting surface diameter complementary to the external mounting surface diameter;
a second threaded set-screw bore having a second set-screw axis is defined in the coupling tube to receive a second set-screw;
the second set-screw axis is oblique to the rivet installation axis;
when the anvil mounting assembly is mounted on the mounting post, the second set-screw is to removably contact the second whistle notch, thereby preventing the anvil mounting assembly from rotating relative to the mounting post and thereby urging the mounting post deeper into the coupling tube to lock the coupling tube onto the mounting post;
the coupling tube has a coupling tube anvil end opposite to the coupling tube mounting end, the coupling tube anvil end having an anvil receiving socket defined therein; and
the riveting anvil has an anvil root end penetrating into and removably engaging the coupling tube to rigidly mount the riveting anvil and form the anvil mounting assembly.

6. The self-piercing rivet installation apparatus as defined in claim 1 wherein:
the rigid C-frame has a rigid back;
the first jaw extends from the rigid back; and
the second jaw extends from the rigid back to form a mouth of the rigid C-frame.

7. The self-piercing rivet installation apparatus as defined in claim 1 wherein:
   the installation head includes a feed mechanism to automatically feed separate, self-piercing rivets into a breech end of a tubular nose piece; and
   the self-piercing rivet installation apparatus is to clamp a first workpiece layer against a second workpiece layer between the tubular nose piece and the riveting anvil.

8. The self-piercing rivet installation apparatus as defined in claim 7 wherein the installation head further includes:
   a ram disposed at the installation head mounting end of the installation head, the ram having an internal mounting thread, complementary to an external mounting thread defined on the leading end of the drive spindle, defined therein;
   a setting punch rigidly attached to the ram, the setting punch coaxial to the rivet installation axis; and
   a setting pin rigidly attached to the setting punch, the setting pin coaxial to the rivet installation axis, wherein the setting pin is axially translatable relative to a bore defined coaxially with the rivet installation axis in the nose piece.

9. The self-piercing rivet installation apparatus as defined in claim 8, having:
   a proximal operational mode wherein the anvil mounting assembly is mounted on the mounting post in the second jaw, and the installation head is mounted on the drive spindle, wherein the drive spindle is to drive the installation head and the ram along the rivet installation axis toward the riveting anvil; and
   a distal operational mode wherein the anvil mounting assembly is mounted on the drive spindle, and the installation head is mounted on the mounting post in the second jaw, wherein the drive spindle is to drive the riveting anvil along the rivet installation axis toward the installation head.

10. The self-piercing rivet installation apparatus as defined in claim 1, further comprising an actuator assembly mounted on the rigid C-frame wherein the actuator assembly is to actuate the drive spindle along the rivet installation axis.

11. The self-piercing rivet installation apparatus as defined in claim 10 wherein the actuator assembly includes:
   an actuator having an output shaft to rotate with an output torque; and
   a transmission to multiply the output torque and to turn a jack screw to actuate the drive spindle along the rivet installation axis.

12. The self-piercing rivet installation apparatus as defined in claim 11 wherein the actuator is an electric motor.

13. The self-piercing rivet installation apparatus as defined in claim 11 wherein the actuator is an air motor.

14. The self-piercing rivet installation apparatus as defined in claim 10 wherein the actuator assembly includes a hydraulic piston connected to the drive spindle to actuate the drive spindle.

15. The self-piercing rivet installation apparatus as defined in claim 10 wherein the rigid C-frame is mounted on a robotic arm.

16. The self-piercing rivet installation apparatus as defined in claim 15 wherein a linear slide bearing is disposed between the rigid C-frame and the robotic arm.

17. A method of operating the self-piercing rivet installation apparatus as defined in claim 1, the method comprising:
   actuating the drive spindle to install a first instance of the self-piercing rivet to join a first workpiece layer to a second workpiece layer;
   dismounting the anvil mounting assembly from the drive spindle;
   dismounting the installation head from the mounting post;
   mounting the anvil mounting assembly on the mounting post;
   mounting the installation head on the drive spindle; and
   actuating the drive spindle to install a second instance of the self-piercing rivet to join a third workpiece layer to a fourth workpiece layer.

\* \* \* \* \*